Aug. 6, 1968     B. RIDER     3,396,349
TECHNIQUE FOR VARYING THE BANDWIDTH
OF A SPIN RESONANT DEVICE
Filed Nov. 7, 1966
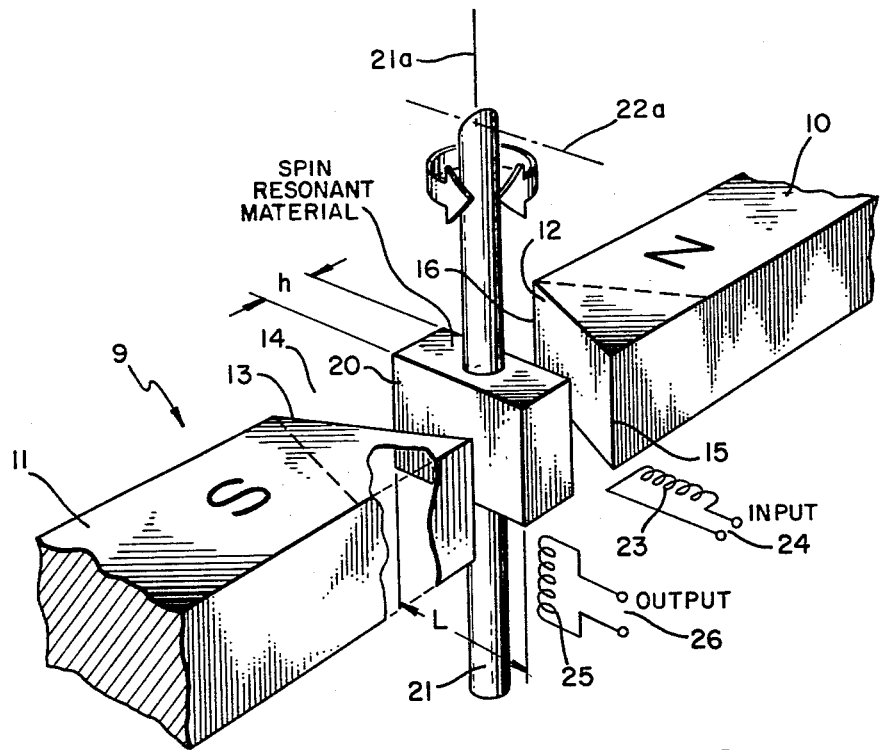
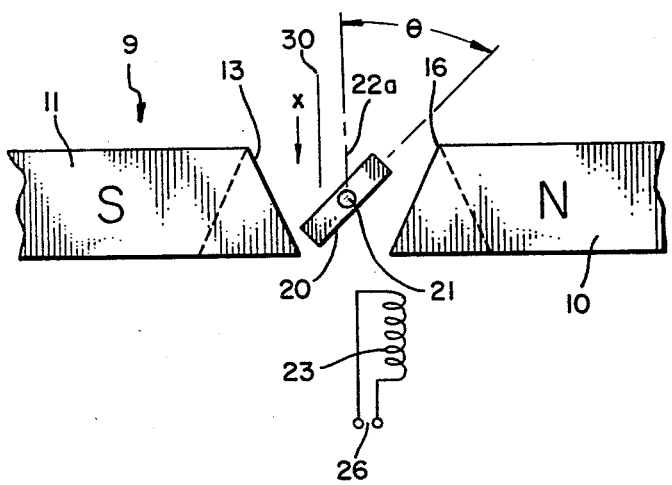
INVENTOR.
BERNARD RIDER
BY Roger T. Frost
Attorney

United States Patent Office 3,396,349
Patented Aug. 6, 1968

3,396,349
TECHNIQUE FOR VARYING THE BANDWIDTH
OF A SPIN RESONANT DEVICE
Bernard Rider, Bethesda, Md., assignor to Litton Systems, Inc., Beverly Hills, Calif., a corporation of Maryland
Filed Nov. 7, 1966, Ser. No. 592,474
6 Claims. (Cl. 333—70)

This invention relates in general to spin resonance, and in particular to a technique for varying the bandwidth of a device utilizing spin resonance phenomena.

Apparatus using spin resonance technology utilizes the fact that certain materials contain numerous nuclei, uncoupled electrons, or other sub-atomic particles which, according to classical theory, are free to spin or orbit within the material, thus providing numerous sub-atomic dipoles in the material. When a material containing spin resonant particles is subjected to a magnetic field, these spin resonant particles, being electrically charged, tend to change orientation by shifting into alignment with the magnetic field. Because these particles also exhibit a spinning movement, however, the gyroscopic effect resulting from this movement causes these particles to precess about the applied magnetic field, rather than simply to shift into alignment with the field.

As is known to those skilled in the art, the rate of precession or oscillation of spin resonant particles in a mass subjected to a magnetic field as described above is dependent, among other things, upon the strength of the magnetic field. Assuming a magnetic field having generally uniform intensity throughout, then the spin resonant material can be chosen so that the spin resonant particles under consideration therein oscillate within a few cycles per second of a certain resonant frequency. If an alternating input signal then is applied to the mass, as by a suitable coil producing a field transverse to the magnetic field, then the spin resonant particles, for example, the nuclei of the mass, exhibit resonance when a signal of or very close to this resonant frequency is applied to this coil. The occurrence of this resonant state can be detected with a second coil associated with the spin resonant mass and positioned at right angles both to the magnetic field and to the first coil.

An apparatus as described thus far is useable as a filter device exhibiting an extremely narrow bandwidth to signals applied thereto. This bandwidth is too narrow for certain purposes or applications, such as passage of some communication channels requiring a bandwidth of several hundred or several thousand cycles per second. To widen the bandwidth of spin resonant filters, a spin resonant mass may be subjected to a non-homogeneous magnetic field so that the spin resonant particles in different parts of the spin resonant mass are subjected to different magnetic field strengths and thus have different resonant frequencies. In this way, the resonant frequency, and thus the bandwidth, of a filter utilizing a spin resonant device is broadened to an extent depending on the range or spectrum of intensity of the non-homogeneous magnetic field.

Even with a spin resonant filter having increased bandwidth as described above, the need still exists for a filter device using spin resonance techniques and having a bandwidth which can readily and easily be varied to suit the needs or conditions of use. While one way in which this might be accomplished would be to vary the extent of non-homogeneity of the magnetic field applied to the material, this characteristic of field strength is generally a function of magnetic field source design and is not readily alterable in the magnet itself.

According to the present invention, there is provided a simple and inexpensive technique for varying the bandwidth of a spin resonant device between predetermined upper and lower bandwidth limits.

Accordingly, it is an object of this invention to provide a new and improved spin resonance device.

It is another object of this invention to provide a spin resonance device having a selectively variable bandwidth.

It is a further object of this invention to provide an improved spin resonance filter.

It is an additional object of this invention to provide a spin resonance filter having a selectively variable bandwidth.

It is still another object of this invention to provide a spin resonance filter, the bandwidth of which is readily and easily varied within predetermined limits.

It is a yet further object of this invention to provide a spin resonance filter which has a selectively variable bandwidth and which is relatively inexpensive to fabricate.

The exact nature of this invention, as well as other objects and advantages thereof, will be readily apparent from consideration of the following specification relating to the annexed drawing in which:

FIG. 1 shows an isometric view of a spin resonance filter constructed according to this invention; and FIG. 2 shows a plan view of the filter of FIG. 1, with the angle of the spin resonant mass changed for illustrative purposes.

Stated generally, this invention provides a spin resonant mass which is subjected to a non-homogeneous magnetic field and which is configured to have a frontal dimension being selectively changeable as seen in a plane perpendicular to the magnetic field. This mass is manipulated within the magnetic field to vary the effective frontal dimension of the mass as seen in a plane perpendicular to the magnetic field, thereby varying the range of intensity of the non-homogeneous field that is applied to the mass.

More particularly, and with reference to FIG. 1 and FIG. 2, there is shown an embodiment indicated generally at 9 of a spin resonant device according to this invention and including a magnetic field source having a north pole 10 and a south pole 11. These poles have diverging pole faces 12 and 13, respectively, to produce in a region 14 between the poles a non-homogeneous magnetic field having a spectrum of intensity linearly varying between a maximum intensity at one side 15 thereof and a minimum intensity at another side 16 thereof.

Positioned within the region 14 is a mass 20 of a suitable spin resonant material. The mass 20 is secured to a shaft 21 which is disposed along an axis 21a perpendicular to the static magnetic field in the region 14 and which is mounted by any suitable device for rotation around this axis. The angle which rotation about the axis 21a causes the shaft 21 and the mass 20 to define with respect to a reference line 22a perpendicular to the static magnetic field is designated as angle $\theta$, shown in FIG. 2.

Situated adjacent to the mass 20 in a manner well known to those skilled in the art is a first or input coil 23 having electrical terminals 24 and a second or output coil 25 having electrical terminals 26. The coils 23 and 25 are used in a known manner to supply input signals to the spin resonant mass 20 and to receive output signals within the range of resonance of the mass.

In understanding the operation of this embodiment of the invention, it should be remembered that the bandwidth of a spin resonant filter depends generally upon the intrinsic bandwidth of the spin resonant mass and the homogeneity of a magnetic field in which the mass is located. Assuming the theoretical case where the static magnetic field is perfectly homogeneous, then the bandwidth B of a circuit utilizing a spin resonant filter is $B = \Delta f$, where $\Delta f$ is the intrinsic bandwidth of the spin resonant mass. If, however, the static magnetic field intensity H varies across an effective dimension of the mass which is perpendicular to the static field, for example, a dimension $x$ as graphically projected onto an imaginary plane positioned in and perpendicular to the static magnetic field in the region 14 and partially depicted in FIG. 2 as a line 30, then the bandwidth of the circuit is:

$$B = \Delta f + a \int_{x_1}^{x_2} (dH/dx) dx \quad (1)$$

where:

$dH/dx$ is the static field variation, and $a$ is a constant of proportionality.
$x_1$ and $x_2$ are the values of the dimension $x$ for which the static magnetic field intensity H within the sample is at a minimum and a maximum, respectively.

If the field intensity H varies uniformly with respect to the $x$ dimension, that is, if $dH/dx$ equals a constant $k$, then the bandwidth of the circuit is:

$$B = \Delta f + ak(\Delta x) \quad (2)$$

where $\Delta x$ is the effective mass length as projected onto the perpendicular plane 30.

From the foregoing, it can be seen that the bandwidth of the filter is linearly variable over a certain range if the static magnetic field intensity varies linearly in the $x$ direction as shown in the depicted embodiment and if the quantity $\Delta x$ is variable. The linear field variation is produced by the divergent pole faces 12 and 13.

Variation of the quantity $\Delta x$ is accomplished by rotation of the mass 20 on the axis 21a. Assuming the mass 20 has a length L and a width $h$, then $\Delta x = L \cos \theta + h \sin \theta$. Substituting this quantity into Formula 2, then the bandwidth is given by:

$$B = \Delta f + ak(L \cos \theta + h \sin \theta)$$

and so it can be seen that the bandwidth of the device of the invention is dependent only on the angular position $\theta$ of the mass 20 with respect to the direction of the static magnetic field produced by the poles 11 and 12. It may be understood that the minimum bandwidth occurs when $\theta = 90°$, i.e., when dimension $h$ is exactly perpendicular to the static magnetic field. The maximum bandwidth occurs when $\theta = \tan^{-1} h/L$, or when the diagonal dimension of the mass 20 as seen in FIG. 2 is parallel to the imaginary plane 30 and thus is perpendicular to the static magnetic field. Rotation of the mass between these two extreme positions produces a spectrum of effective mass lengths $\Delta x$.

From the foregoing it can be seen that there has been disclosed and described a technique for varying the bandwidth of a spin resonant filter or other spin resonant device wherein bandwidth variations are accomplished simply and without resort to complex apparatus for varying the extent of magnetic field non-homogeneity. Although rotation of the resonant mass around the axis 21a is used in the depicted embodiment as a technique for varying the effective dimension of the mass 20 as seen perpendicular to the magnetic field, other suitable techniques for varying effective spin resonant mass dimensions, such as insertion of a wedge-shaped sample into the magnetic field or compression of a loosely packed sample, by way of example only, may also be utilized.

It should be understood, of course, that the foregoing relates only to a preferred embodiment of the invention and that numerous applications or alterations may be made therein without departing from the spirit and the scope of the inventions as set forth in the appended claims.

What is claimed is:
1. Apparatus for varying the bandwidth of a spin resonant device, comprising:

means for producing a magnetic field throughout a region,
the intensity of said magnetic field varying as a function of a preselected dimension of said region;
spin resonant means disposed in said region so as to be subjected to said magnetic field;
said spin resonant means presenting an effective dimension as graphically projected onto a plane contained in said region and perpendicular to said magnetic field; and
means for selectively varying the length of said effective dimension;
said effective dimension of said spin resonant mass being parallel to said preselected dimension of said region.

2. Apparatus as in claim 1, wherein:
said intensity variation of said magnetic field is a linear function of said preselected dimension.

3. Apparatus as in claim 2, wherein:
said spin resonant means is configured to cause said effective dimension to have a first length and a second length, said second length being smaller than said first length; and
said means for selectively varying the length of said effective dimension includes means for selectively positioning said spin resonant means in said magnetic field to present a spectrum of length of said effective dimension ranging from said first length to said second length.

4. Variable bandwidth spin resonant filter apparatus, comprising:
a pair of magnetic poles,
said magnetic poles having a pair of spaced apart confronting end pieces defining a gap region;
said magnetic poles having polarities chosen to produce a magnetic field in said gap region;
means causing the intensity of said magnetic field to vary as a function of a preselected dimension perpendicular to said magnetic field;
a mass of spin resonant material at least partially disposed in said gap region;
signal input means for applying input signals to said mass;
signal output means for receiving output signals from said mass; and
mass positioning means operating on said mass for selective movement of said mass in said gap region;
said mass being irregularly configured so that movement of said mass in said gap region responsive to said mass positioning means causes variation of the effective dimension of said mass which is parallel to said preselected dimension of said magnetic field.

5. Apparatus as in claim 4, wherein:
the intensity of said magnetic field varies linearly as a function of said preselected dimension.

6. Apparatus as in claim 5, wherein:
said mass is generally rectangular in configuration and is retained by said mass positioning means for selective angular movement in said gap region so that the breadth of the spectrum of magnetic field intensity to which said mass is subjected is a function of the angular position of said mass.

References Cited
UNITED STATES PATENTS 2,948,868  8/1960  Reeves _____ 333—73 X
3,054,042  9/1962  Weiss.

HERMAN KARL SAALBACH, *Primary Examiner.*
PAUL GENSLER, *Examiner.*